(12) United States Patent
Dominguez et al.

(10) Patent No.: US 10,542,314 B2
(45) Date of Patent: Jan. 21, 2020

(54) MEDIA CONTENT DELIVERY WITH CUSTOMIZATION

(71) Applicant: AT&T Mobility II LLC, Atlanta, GA (US)

(72) Inventors: Brian Dominguez, Atlanta, GA (US); Matthew Mayheu, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/925,954

(22) Filed: Mar. 20, 2018

(65) Prior Publication Data

US 2019/0297380 A1  Sep. 26, 2019

(51) Int. Cl.
*H04N 21/4402* (2011.01)
*H04N 21/45* (2011.01)

(52) U.S. Cl.
CPC ... *H04N 21/44029* (2013.01); *H04N 21/4532* (2013.01)

(58) Field of Classification Search
CPC ............ H04N 21/44029; H04N 21/4532
See application file for complete search history.

(56) References Cited

U.S. PATENT DOCUMENTS

| | | | |
|---|---|---|---|
| 6,411,949 B1 | 6/2002 | Schaffer et al. | |
| 7,716,232 B2 | 5/2010 | Glenn et al. | |
| 7,925,549 B2 | 4/2011 | Looney et al. | |
| 7,994,930 B2 | 8/2011 | Gajdos et al. | |
| 8,640,021 B2 | 1/2014 | Perez et al. | |

(Continued)

FOREIGN PATENT DOCUMENTS

| | | |
|---|---|---|
| WO | 0137189 A2 | 5/2001 |
| WO | 2015127361 A1 | 8/2015 |
| WO | 2015135066 A1 | 9/2015 |

OTHER PUBLICATIONS

"Creative Optimization", Sizmek, sizmek.com, https://web.archive.org/web/20180202084801/https://www.sizmek.com/creative-optimization/, Feb. 2, 2017, 2 pages.

(Continued)

*Primary Examiner* — Benjamin R Bruckart
*Assistant Examiner* — Aklil M Tesfaye
(74) *Attorney, Agent, or Firm* — Guntin & Gust, PLC; Jay H. Anderson

(57) ABSTRACT

Aspects of the subject disclosure may include, for example, a device in which a processing system facilitates performance of operations including obtaining content for presentation to audience members, generating versions of the content, storing the versions in a library, and configuring a presentation of the content at a presentation device. The system detects characteristics of the audience members; if an appropriate version for an audience member is not available in the library, the system generates a customized version. A set of versions is presented simultaneously to the audience members, each of whom accordingly experiences a presentation version. The system receives data regarding real-time reactions of each audience member to the presentation version. An alternate presentation version, which can include a real-time adjustment of the content, is provided based on the reaction data of an audience member and presented to the audience member. Other embodiments are disclosed.

20 Claims, 10 Drawing Sheets

(56) References Cited

U.S. PATENT DOCUMENTS

| | | | |
|---|---|---|---|
| 8,677,410 B2 | 3/2014 | Kline et al. | |
| 8,726,312 B1 | 5/2014 | Hewinson et al. | |
| 8,752,087 B2 | 6/2014 | Begeja et al. | |
| 8,839,290 B2 | 9/2014 | Roberts et al. | |
| 8,949,889 B1 | 2/2015 | Erdmann | |
| 9,019,149 B2 | 4/2015 | Leuthardt et al. | |
| 9,332,284 B1 | 5/2016 | Taylor | |
| 9,460,093 B2 | 10/2016 | Mickelsen et al. | |
| 9,510,030 B2 | 11/2016 | Kanigsberg et al. | |
| 9,749,683 B2 | 8/2017 | Roberts et al. | |
| 9,788,032 B2 | 10/2017 | Conrad et al. | |
| 10,088,983 B1* | 10/2018 | Qaddoura | H04N 21/23439 |
| 2007/0271580 A1 | 11/2007 | Tischer et al. | |
| 2010/0058381 A1 | 3/2010 | Begeja et al. | |
| 2011/0307924 A1* | 12/2011 | Roberts | H04N 5/44543 |
| | | | 725/44 |
| 2011/0321073 A1 | 12/2011 | Yarvis et al. | |
| 2012/0072936 A1 | 3/2012 | Small et al. | |
| 2013/0067021 A1* | 3/2013 | Broberg | H04N 21/47202 |
| | | | 709/217 |
| 2014/0150009 A1* | 5/2014 | Sharma | H04N 21/4126 |
| | | | 725/28 |
| 2014/0278969 A1 | 9/2014 | Newell et al. | |
| 2014/0324749 A1 | 10/2014 | Peters et al. | |
| 2014/0324922 A1 | 10/2014 | Edelstein et al. | |
| 2015/0181291 A1 | 6/2015 | Wheatley | |
| 2015/0304733 A1* | 10/2015 | Mozell | H04N 21/632 |
| | | | 725/37 |
| 2016/0134916 A1* | 5/2016 | Eldering | H04N 7/165 |
| | | | 725/35 |
| 2018/0020963 A1 | 1/2018 | Friant | |
| 2018/0288478 A1* | 10/2018 | Durham | H04N 21/44218 |

OTHER PUBLICATIONS

"Jivox Introduces First Platform for Dynamically Personalized Video Advertising Campaigns", Jivox, jivox.com, https://www.jivox.com/press/jivox-introduces-first-platform-for-dynamicallypersonalized-video-advertising-campaigns/, Aug. 25, 2016, 4 pages.

"Platform", vehicle, vhcl.co, https://web.archive.org/web/20170416120243/https://vhcl.co/platform, Apr. 16, 2017, 4 pages.

"Smartplay by Verizon, our 1 to 1 session management technology", Verizon, verizondigitalmedia.com, https://web.archive.org/web/20170706005233/https://www.verizondigitalmedia.com/platform/uplynk-video-streaming/1-to-1-session-management/, Jul. 6, 2017, 21 pages.

Ha, Anthony, "Clinch raises $3M for personalized video ads", Clinch, techcrunch.com, https://techcrunch.com/2017/09/14/clinch-raises-3m-for-personalized-videoads/, Sep. 14, 2017, 5 pages.

Lawler, Ryan, "iPad DJ Launches Lightwave to Provide Wearable, Real-Time Analytics for Events", Lightwave, techcrunch.com, https://techcrunch.com/2014/03/08/lightwave/, Mar. 8, 2014, 5 pages.

Vinhas, Vasco et al., "Dynamic Multimedia Interfaces Based on Automatic Real-time User Emotion Assessment.", http://www.scitepress.org/DigitalLibrary/Link.aspx?doi=10.5220%2f0002866700210029, 2010, 9 pages.

* cited by examiner

MEDIA CONTENT DELIVERY WITH CUSTOMIZATION

FIELD OF THE DISCLOSURE

The subject disclosure relates to distribution of media content, and more particularly to a system for providing content for users that is customized for those users.

BACKGROUND

Media content is typically distributed to all consumers (for example, viewers of a video program) in a single version; this version may or may not be appropriate for all viewers in a particular audience. The audience (its participants, characteristics and needs) may also change during the presentation of the content.

BRIEF DESCRIPTION OF THE DRAWINGS

Reference will now be made to the accompanying drawings, which are not necessarily drawn to scale, and wherein.

DETAILED DESCRIPTION

Figure 1:
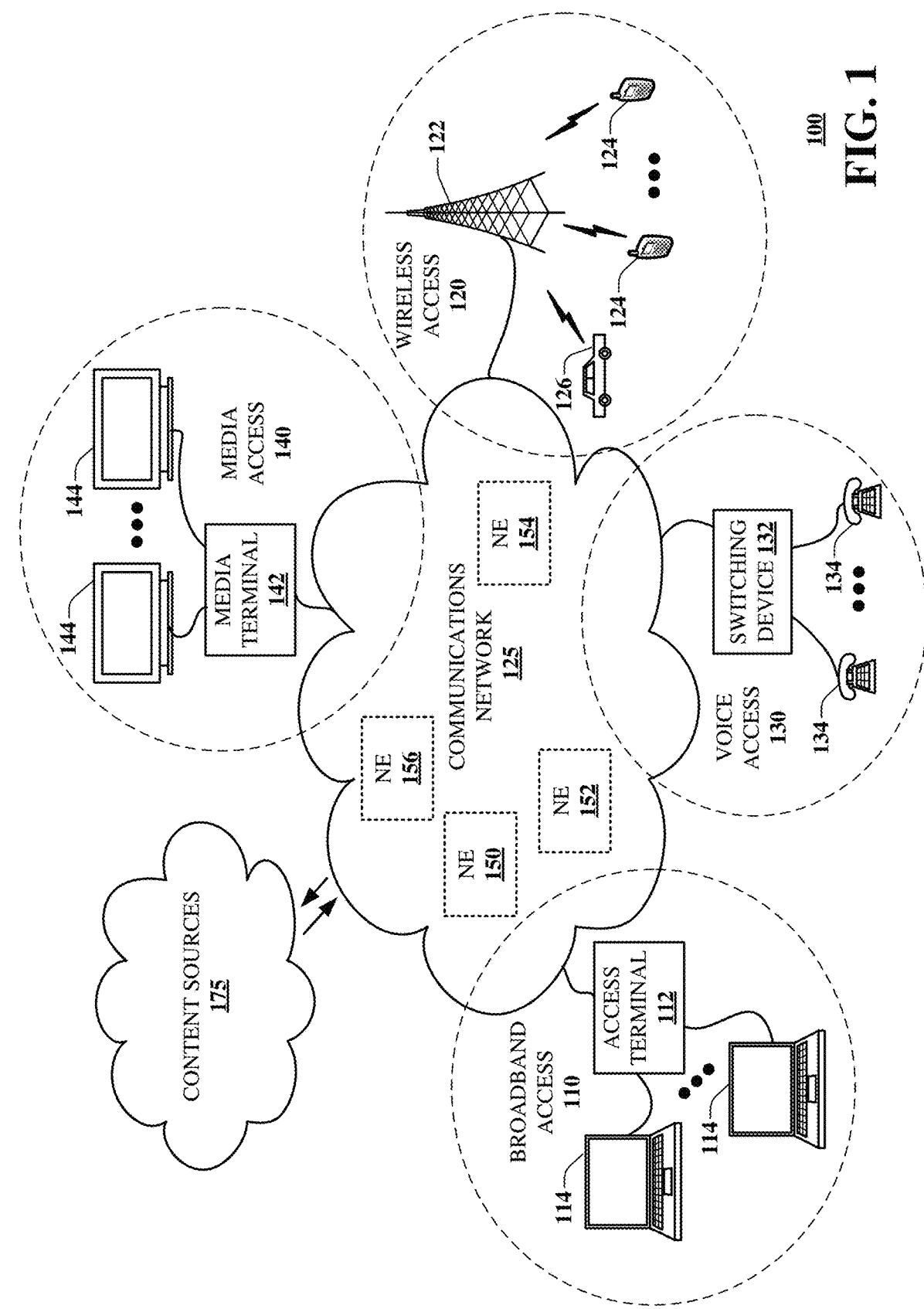
FIG. 1 is a block diagram illustrating an example, non-limiting embodiment of a communications network in accordance with various aspects described herein.

The subject disclosure describes, among other things, illustrative embodiments for a system and method for providing content to users that is customized and adjusted in real time, so that dynamically customized content versions are delivered to different users, even if those users are in proximity to each other and consuming the content at the same time. Other embodiments are described in the subject disclosure.

One or more aspects of the subject disclosure include a method in which a processing system obtains content for presentation to a plurality of audience members, generates a plurality of versions of the content, stores the plurality of versions in a library, and configures a presentation of the content at a presentation device; the configuring is performed in accordance with capabilities of the presentation device. The method also includes detecting characteristics of the audience members for the presentation and, in response to a determination that an appropriate version is not available in the library for presentation to an audience member according to the detecting of the characteristics, generating a customized version of the content for presentation to that audience member. The method further includes simultaneously presenting a set of versions of the content to the audience members, the set of versions including the customized version and at least one of the stored plurality of versions; each of the audience members accordingly experiences a presentation version. The method also includes receiving reaction data regarding real-time reactions of each of the audience members regarding the presentation version, the reaction data comprises signals from equipment of the audience members, images of the audience members captured by the presentation device, or a combination thereof. The method further includes providing an alternate presentation version based on the reaction data of an audience member, and presenting the alternate presentation version to the audience member.

One or more aspects of the subject disclosure include a device comprising a processing system including a processor, and a memory that stores executable instructions; the instructions, when executed by the processing system, facilitate performance of operations. The operations include obtaining content for presentation to a plurality of audience members, generating a plurality of versions of the content, storing the plurality of versions in a library, and configuring a presentation of the content at a presentation device. The operations also include detecting characteristics of the audience members for the presentation and, responsive to a determination that an appropriate version is not available in the library for presentation to an audience member according to the detecting of the characteristics, generating a customized version of the content for presentation to that audience member. The operations also include simultaneously presenting a set of versions of the content to the audience members, the set of versions including the customized version and at least one of the stored plurality of versions; each of the audience members accordingly experiences a presentation version. The operations also include receiving reaction data regarding real-time reactions of each of the audience members regarding the presentation version, the reaction data comprises signals from equipment of the audience members, images of the audience members captured by the presentation device, sounds from the audience members captured by the presentation device, or a combination thereof. The operations further include providing an alternate presentation version based on the reaction data of an audience member, and presenting the alternate presentation version to the audience member.

One or more aspects of the subject disclosure include a machine-readable storage medium comprising executable instructions that, when executed by a processing system including a processor, facilitate performance of operations. The operations include obtaining content for presentation to a plurality of audience members, generating a plurality of versions of the content, storing the plurality of versions in a library, and configuring a presentation of the content at a presentation device. The operations also include detecting characteristics of the audience members for the presentation and, responsive to a determination that an appropriate version is not available in the library for presentation to an audience member according to the detecting of the characteristics, generating a customized version of the content for presentation to that audience member. The operations also include simultaneously presenting a set of versions of the content to the audience members, the set of versions including the customized version and at least one of the stored plurality of versions; each of the audience members accordingly experiences a presentation version. The operations also include receiving reaction data regarding real-time reactions of each of the audience members regarding the presentation version, the reaction data comprises signals from equipment of the audience members, images of the audience members captured by the presentation device, or a combination thereof. The operations further include providing an alternate presentation version based on the reaction data of an audience member, and presenting the alternate presentation version to the audience member.

Referring now to FIG. 1, a block diagram is shown illustrating an example, non-limiting embodiment of a communications network 100 in accordance with various aspects described herein. Network 100 can include processing systems for obtaining content, generating and storing versions of content, configuring and delivering presentations of content, and providing alternate presentation versions based on audience reactions, as detailed below. In particular, a communications network 125 provides broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
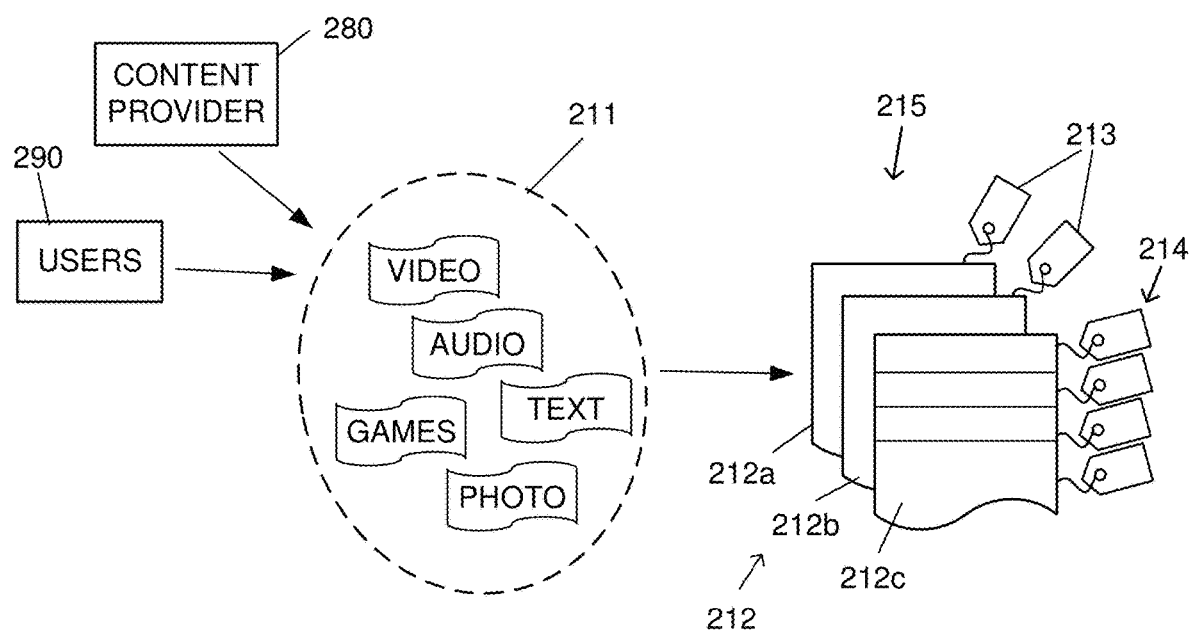
FIG. 2A is a block diagram illustrating an example, non-limiting embodiment of a system functioning within the communication network of FIG. 1 and generating a library of tagged versions of content, in accordance with various aspects described herein.

FIG. 2A is a block diagram illustrating an example, non-limiting embodiment 201 of a system functioning within the communication network of FIG. 1 and generating a library of tagged versions of content, in accordance with various aspects described herein. As shown in FIG. 2A, content items 211 can have various sources, including a content provider 280 and one or more users 290 of the system. In this embodiment, user-generated content can include, but is not limited to, video, audio, games, text, photos, Cinema4D files, haptic/sensory data files, etc.

In further embodiments, user-generated content can be created passively by devices (cameras, microphones, and/or other types of sensors) worn or carried by the user, without requiring the user's attention. Content (images, sounds, etc.) automatically captured from the user devices can then be processed (edited, compressed, etc.) with algorithms applied by the system. Provided that appropriate permissions are obtained, the system can make personalized content ("moments of our lives") available for use in publicly distributed shows or in advertisements.

Figure 2B:
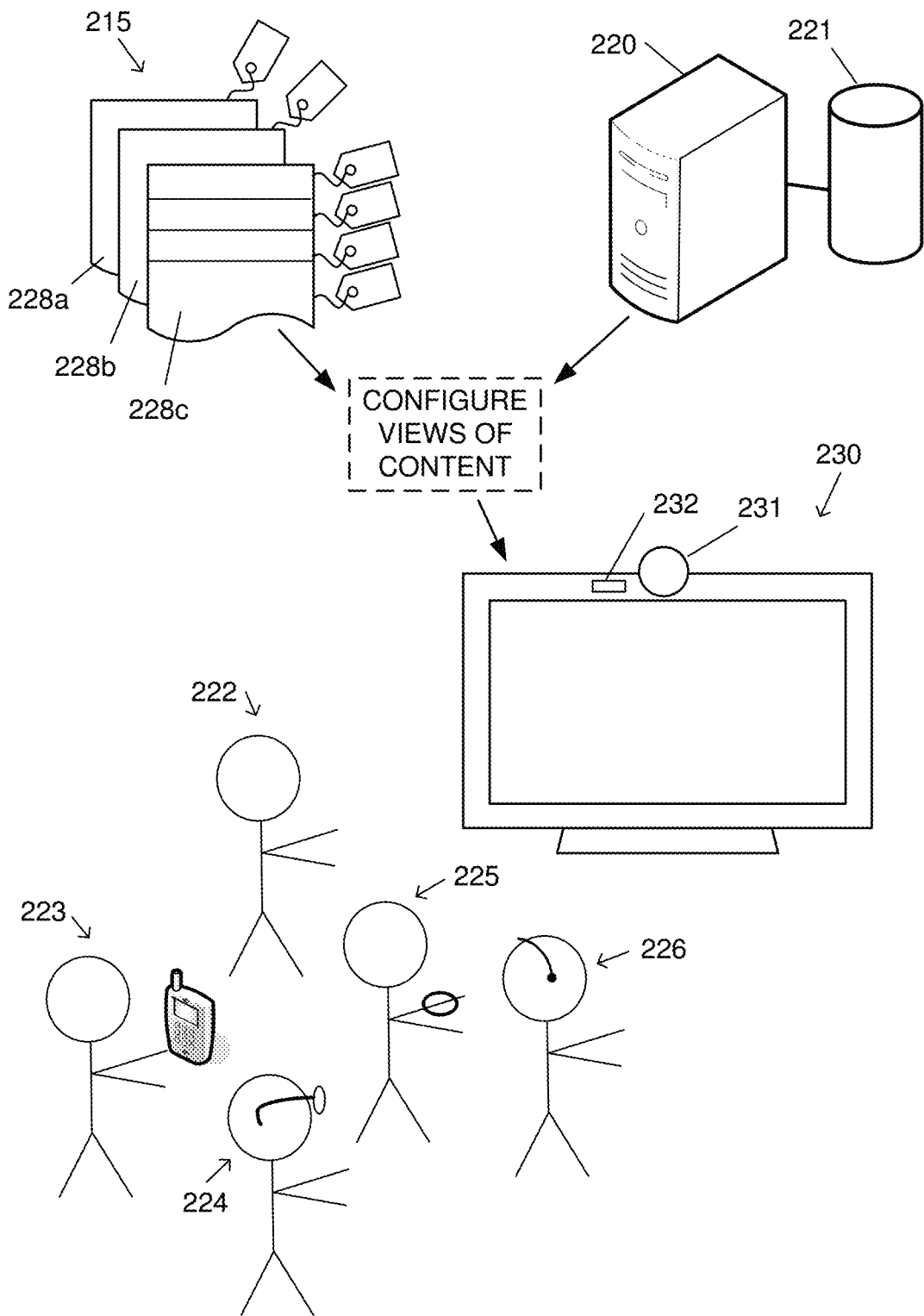
FIG. 2B is a block diagram illustrating an example, non-limiting embodiment of a system functioning within the communication network of FIG. 1 and presenting versions of content to an audience whose members have different characteristics and requirements, in accordance with various aspects described herein.

In an embodiment, the system populates a library 215 with tagged content items. A given content item 212 may have multiple versions 212a, 212b, 212c. For example, an R-rated movie 212a can be edited for language or violent content to generate a PG-rated version 212b and also be edited to generate a version 212c with different music in the soundtrack. As shown in FIG. 2B, the versions have tags 213 that enable the system to identify and deliver different versions. A version may also be divided into segments that have distinct tags (for example, version 212c is shown with four tagged segments 214).

A content segment personalized to a viewer (user-generated or from some other source) can be included in a version to increase that viewer's interest. In an embodiment, the viewer's name and preferences can be inserted into the story line of a video program; for example, "Matt's favorite BBQ venue" as the scene of a crime in a murder mystery.

In this embodiment, the tag for a version or a segment identifies a suitable audience (for example, "appropriate for children" or "not appropriate for children"), in addition to identifying the content.

FIG. 2B is a block diagram illustrating an example, non-limiting embodiment 202 of a system functioning within the communication network of FIG. 1 and displaying content to an audience, in accordance with various aspects described herein. In this embodiment, server 220 is coupled to a content source via the communication network and performs functions of the system. As shown schematically in FIG. 2B, server 220 can configure multiple versions of an item of content for display at presentation device 230. The library 215 of tagged versions is stored at a storage location accessible to the server (for example, storage device 221 at the server location). The versions are configured according to the capabilities of the presentation device (for example, whether the device is a 3D television or can present a polarized-light display). Alternatively, or in addition, the versions can be configured according to preferences of the audience members (for example, the language spoken).

The display device includes a camera 231 and a microphone 232 to obtain images and sounds of the audience members 222-226. In this embodiment, the system detects the audience members and can identify audience members by using a facial recognition procedure that compares images obtained by camera 231 with a database of user images stored at storage device 221. The system can then obtain profiles of various audience members including members' content preferences.

In other embodiments, the system can detect audience members using a variety of techniques including recognizing a person's voice or hand gesture, or analyzing an image of the person's retina. The system also detects devices used by the audience members, for example a cellphone at 223, eyeglasses at 224 for viewing polarized displays, biometric sensors at 225 for transmitting audience feedback data, and headphones at 226 for receiving an alternate soundtrack.

The system facilitates display of content to a group of audience members at the display device; in this embodiment, audience members experience different versions simultaneously. For example, audience member 222 can view and hear an unmodified content version 228a, while at the same time audience member 224 receives a first modified version 228b (different video from version 228a but the same audio) using polarization eyeglasses, and audience member 226 receives a second modified version 228c (same video as version 228a but different audio) using headphones.

In a further embodiment, any of the versions can have a content segment (personalized and/or user-generated) inserted. For example, the system can detect and identify audience member 222 and associate that member with a snapshot or video clip of his/her home, tagged with the member's name and stored in the library; in the opening scene of a video program that shows the exterior of the main character's home, the tagged segment is substituted for the corresponding portion of version 228a. This personalized change in the version may be presented only to audience member 222; meanwhile, audience member 226 views the unmodified video scene. In another embodiment, audience member 223 can view version 228a at the display device, while simultaneously receiving version 228b on his/her cellphone.

In another embodiment, the system uses the preferences in a stored profile of an audience member to determine a favorite brand of product, and inserts a segment with an image of that product in the version being viewed by that audience member. The system can also use the preferences to personalize an advertisement whose message is reinforced by the product placement in the version being viewed.

In a further embodiment, a video game is presented in different versions to different players simultaneously. For example, the players can all view the same opening scene of the game presentation, but the presentations diverge thereafter in accordance with the skill level of the respective players. In this embodiment, the unmodified game is presented to an expert player 222, while a less challenging version is presented to a less-skilled player 224 viewing the game with polarization eyeglasses. The less-skilled player can thus engage with the game alongside the expert player with enjoyment similar to that of the expert player. In a further embodiment, player 224 can request a more challenging version of the game by making an input at his/her game player device, or by making a command such as "Go to next level" which is detected by microphone 232.

The presentation of different versions of content is not limited to audio and video versions. For example, the presentation can include a delivery of haptic content. In this embodiment, an audience member wears a haptic device that can receive control signals from the display device or from the server according to a haptic content file, to provide a tactile experience which may be customized for that audience member.

Figure 2C:
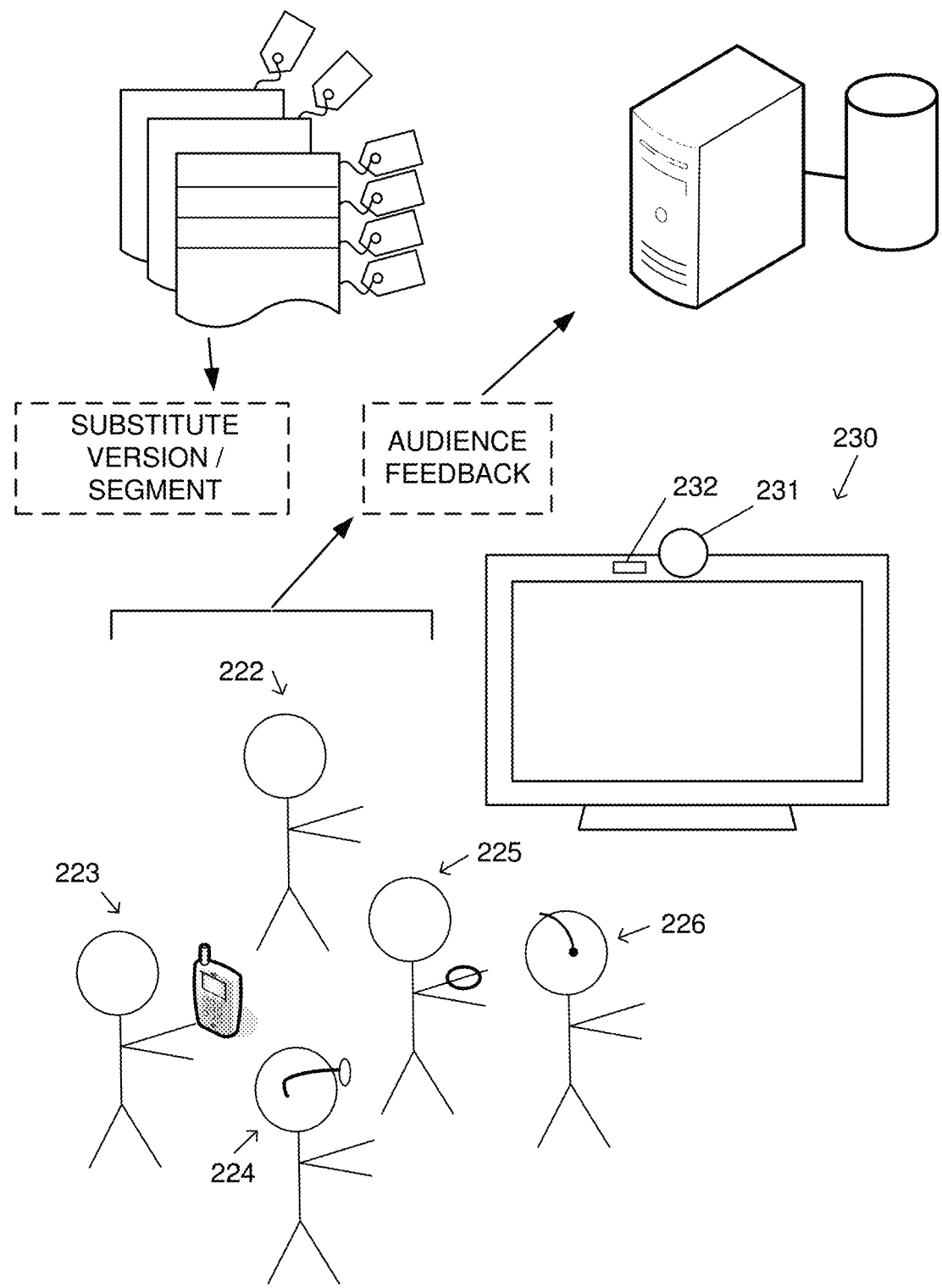
FIG. 2C is a block diagram illustrating an example, non-limiting embodiment of a system functioning within the communication network of FIG. 1 and modifying one or more versions in response to audience feedback, in accordance with various aspects described herein.

FIG. 2C is a block diagram illustrating an example, non-limiting embodiment 203 of a system functioning within the communication network of FIG. 1, and modifying content presentations responsive to audience feedback, in accordance with various aspects described herein. In this embodiment, content is simultaneously consumed and produced by the audience members, in accordance with feedback data provided by the audience.

As shown in FIG. 2C, the various audience members have devices for providing feedback to the system regarding the content being consumed. For example, audience member 225 wears or carries biometric sensors that transmit real-time data regarding the audience members blood pressure, pulse rate, respiration rate, etc. The system analyzes the biometric data to determine the audience member's reaction to the content being consumed. The system also captures real-time images of the audience member(s), for example using camera 231 to detect body movement, hand gestures, facial expressions, etc. which also indicate a real-time reaction (e.g. anger, fear, boredom) to the content. In a further embodiment, the system can detect sound from the audience using microphone 232 and monitor for spoken commands, such as "Replay that scene", "Turn the volume up", "Show a different version", etc.

In this embodiment, the system processes the audience feedback data and modifies the presentation to improve the audience's enjoyment of the experience. The system can substitute a different version of the content, for presentation to one or more audience members. The system can also include personalized segments in the presentation, to engage the audience members' attention.

The audience feedback data can be processed for each audience member separately, with only the version viewed by that audience member being substituted or modified. Alternatively, the feedback data for several audience members, or the entire audience, can be aggregated and processed to generate an audience rating for the content. In another embodiment, the content is an advertisement, and the audience feedback is used to estimate the effectiveness of the advertisement.

In additional embodiments, the system can make real-time adjustments to the content presentation based on the physical and social environments of the presentation. For example, if the system determines (e.g. by using microphone 232) that the presentation is in a physical space with a high noise level, it can increase the audio volume of the presentation without gathering any data from the audience members. In addition, the audience forms a social group whose characteristics change according to who is present in the group at a given time. For example, if the audience consists of a group of five men at the beginning of the presentation, they may all choose to view the same version of a program; however, if a woman joins the group (and is recognized by the system), the system may automatically begin to present an additional and different version, without needing input from the female viewer.

Figure 2D:
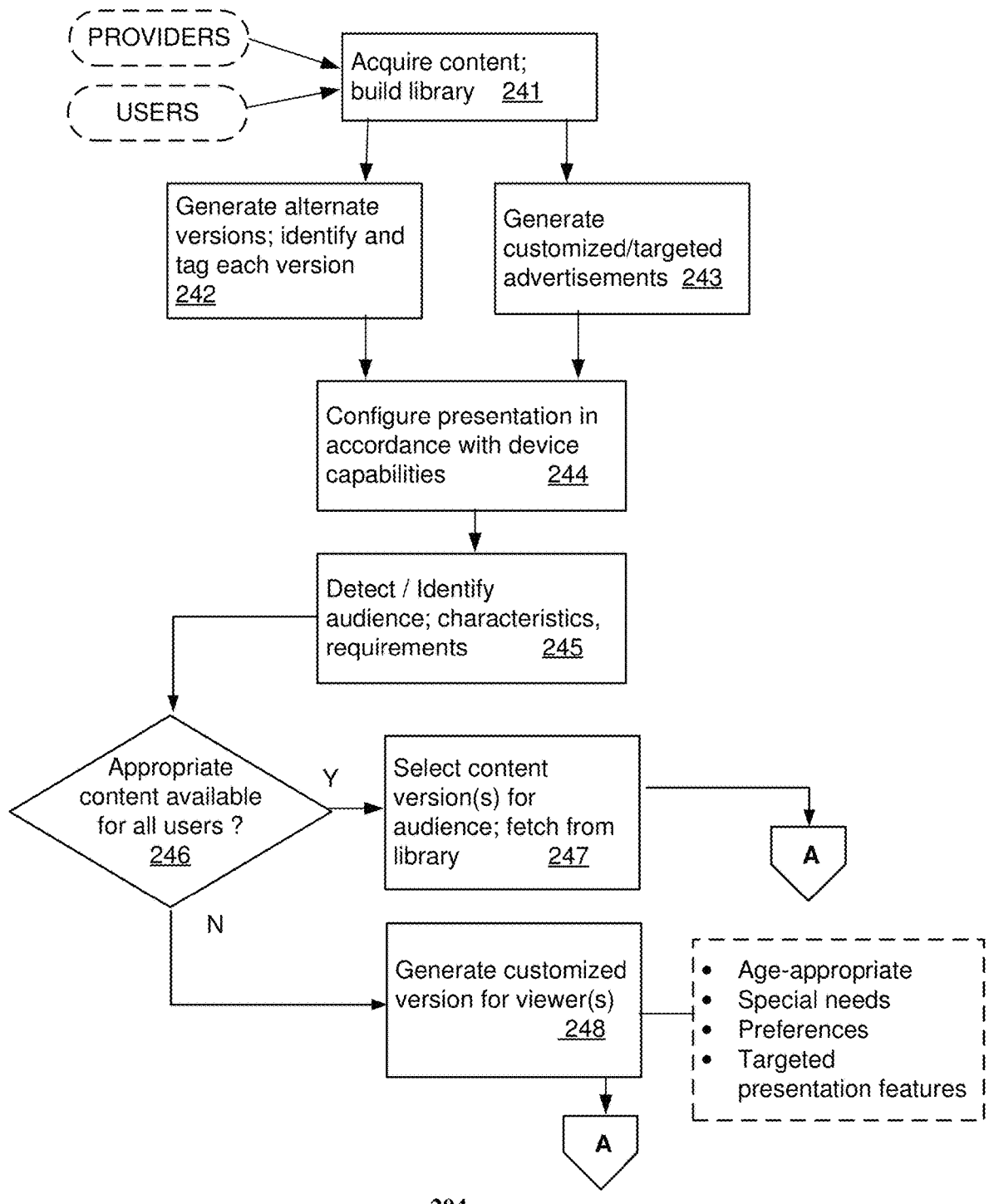
FIG. 2D-2E are connected flowcharts depicting an illustrative embodiment of a method in accordance with various aspects described herein.
Figure 2E:
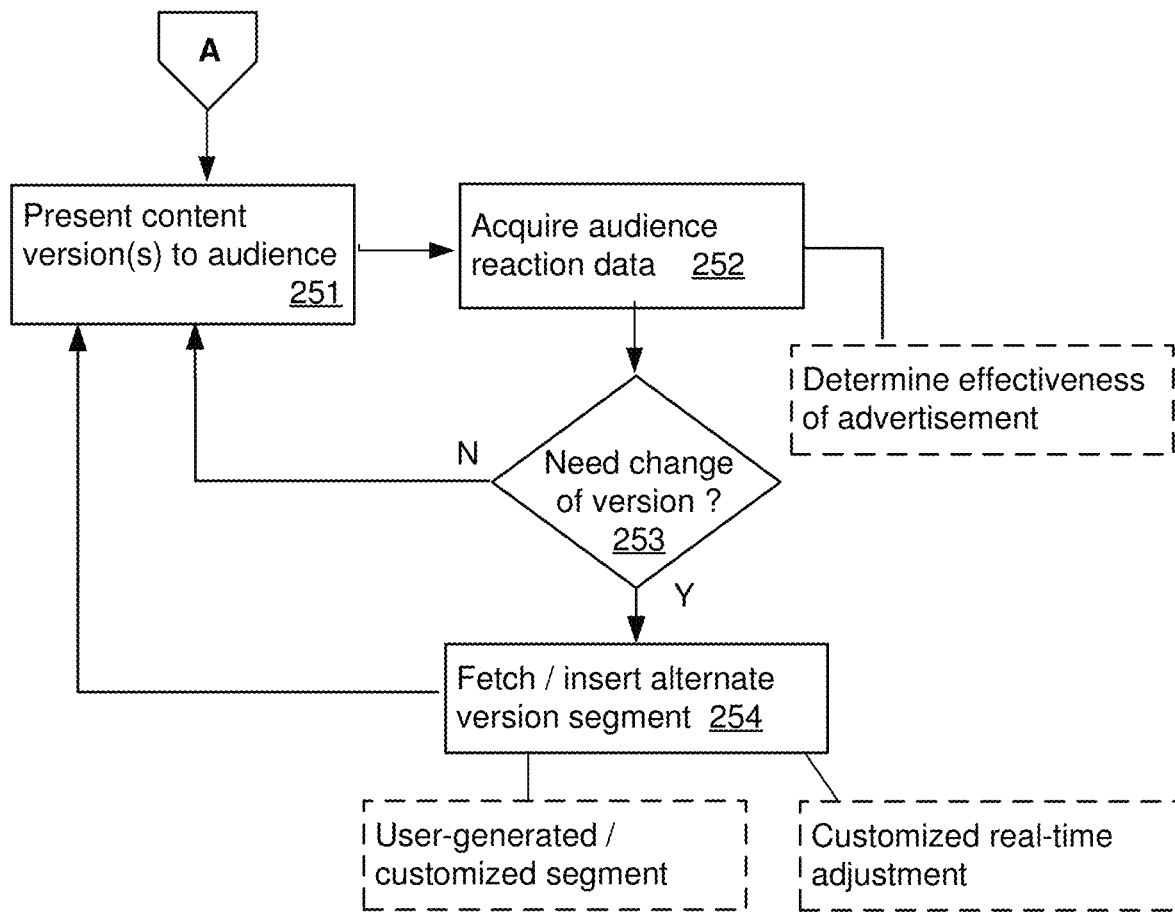

FIGS. 2D-2E are connected flowcharts 204-205 depicting an illustrative embodiment of a method in accordance with various aspects described herein. The method relates to a system providing versions of content that are appropriate to the respective members of the presentation audience, and for making real-time adjustments to the presented content.

In step 241, the system acquires content, generally from both content providers and users (e.g. individuals contributing pictures or videos by using their smart phones) communicating on a network. The system builds a library with the content items tagged; in an embodiment, a tag gives the name of the contributor, a description of the subject, a duration, and a recommended audience. For example, the recommended audience can be "age up to 16," "suitable for vision-impaired", "suitable for hearing-impaired", and so forth. In an embodiment, user-generated content is contributed whose subject is a member of the recommended audience, and the tag includes the name of the subject. The system acquires or generates alternate versions of the content (different languages, profanity/violence deleted, user-generated segments inserted, etc.) which are also tagged and stored (step 242). Alternatively, or in addition, the system can generate customized advertisements for targeting to audience members (step 243).

The system then configures a presentation in accordance with the capabilities of the presentation device (step 244), and detects and identifies the members of the audience (step 245). In an embodiment, the content is configured for presentation at least partly in accordance with the characteristics, preferences and requirements of the audience.

If version(s) are available that are appropriate for all of the audience members (step 246), the system selects those items and retrieves them from the library (step 247). Otherwise, appropriate content is generated (step 248); this content can include system-generated content, user-generated content, or a combination thereof (e.g. system-generated content that is then customized by a user). Criteria for generating appropriate content may include the age of the audience member, physical limitations, preferences, particular likes/dislikes regarding the content, etc.

The versions of content are then presented to the audience (step 251), and the system gathers reaction data (step 252).

In an embodiment, the reaction data is analyzed to determine the effectiveness of an advertisement. If the reaction data indicate that a change in version is not required (step 253), the presentation continues. Otherwise, alternate content is provided (for example, a segment to be inserted) and substituted in the presentation (step 254). The alternate content can include another version or segment stored in the library, and/or adjusted content resulting from a real-time adjustment.

While for purposes of simplicity of explanation, the respective processes are shown and described as a series of blocks in FIGS. 2D-2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
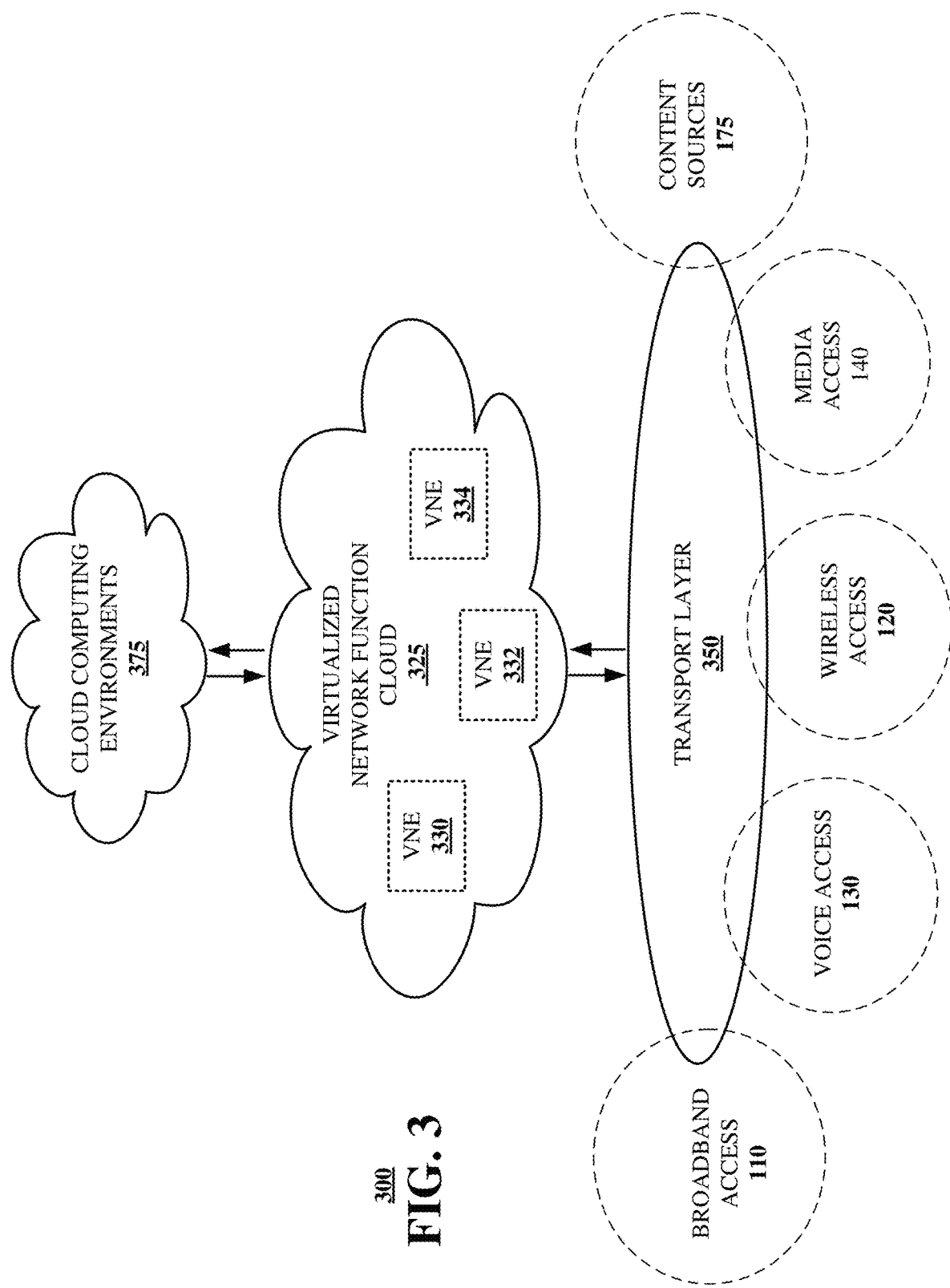
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. Network 300 includes virtual elements that can perform the above-described operations of obtaining content, generating and storing versions of content, configuring presentation of content versions, and providing alternate presentation versions based on audience reactions. In particular, virtualized communication network 300 can be used to implement some or all of the subsystems and functions of communication network 100, the subsystems and functions of systems 201-203, and methods 204-205 presented in FIGS. 1, 2A, 2B, 2C, 2D and 2E.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
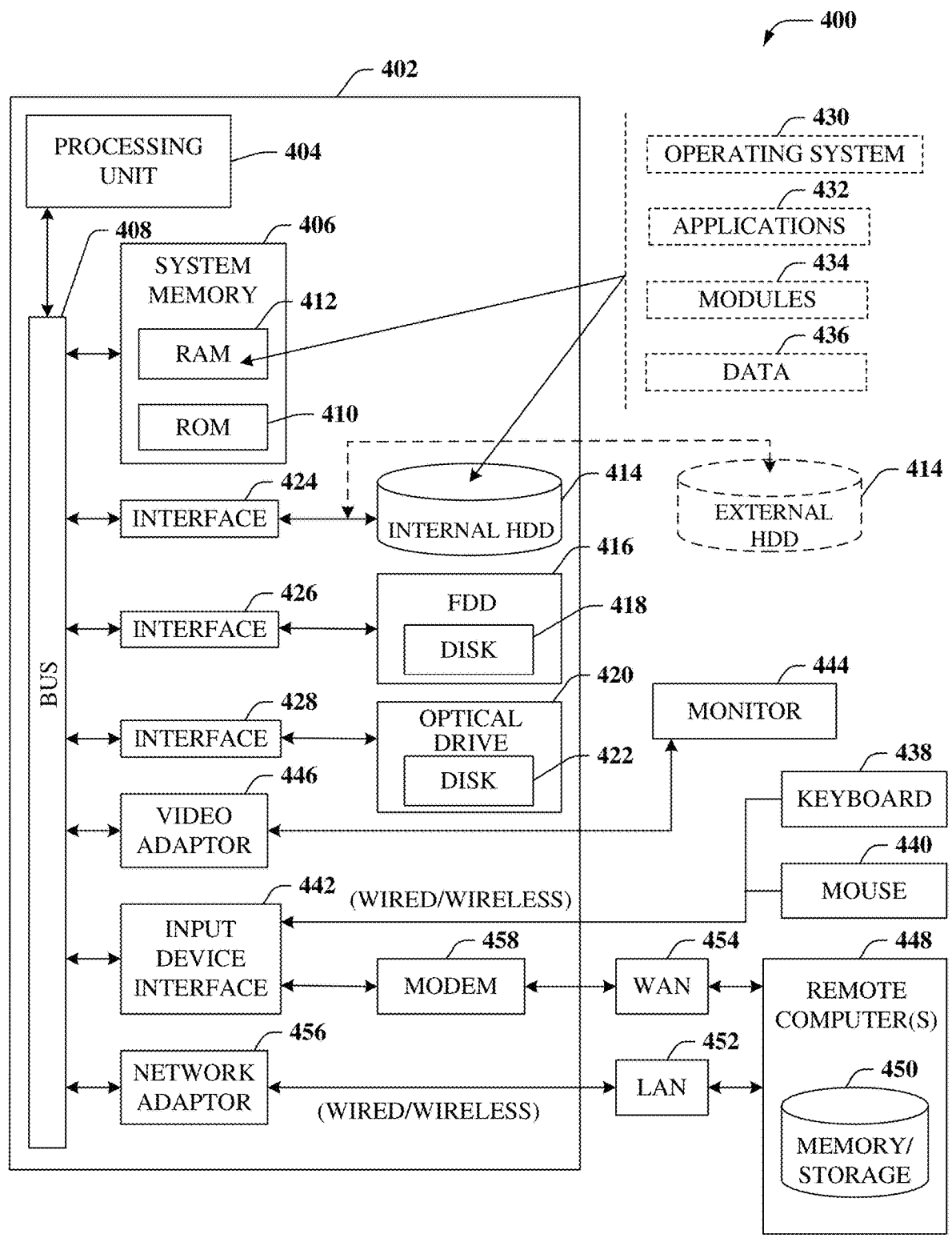
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
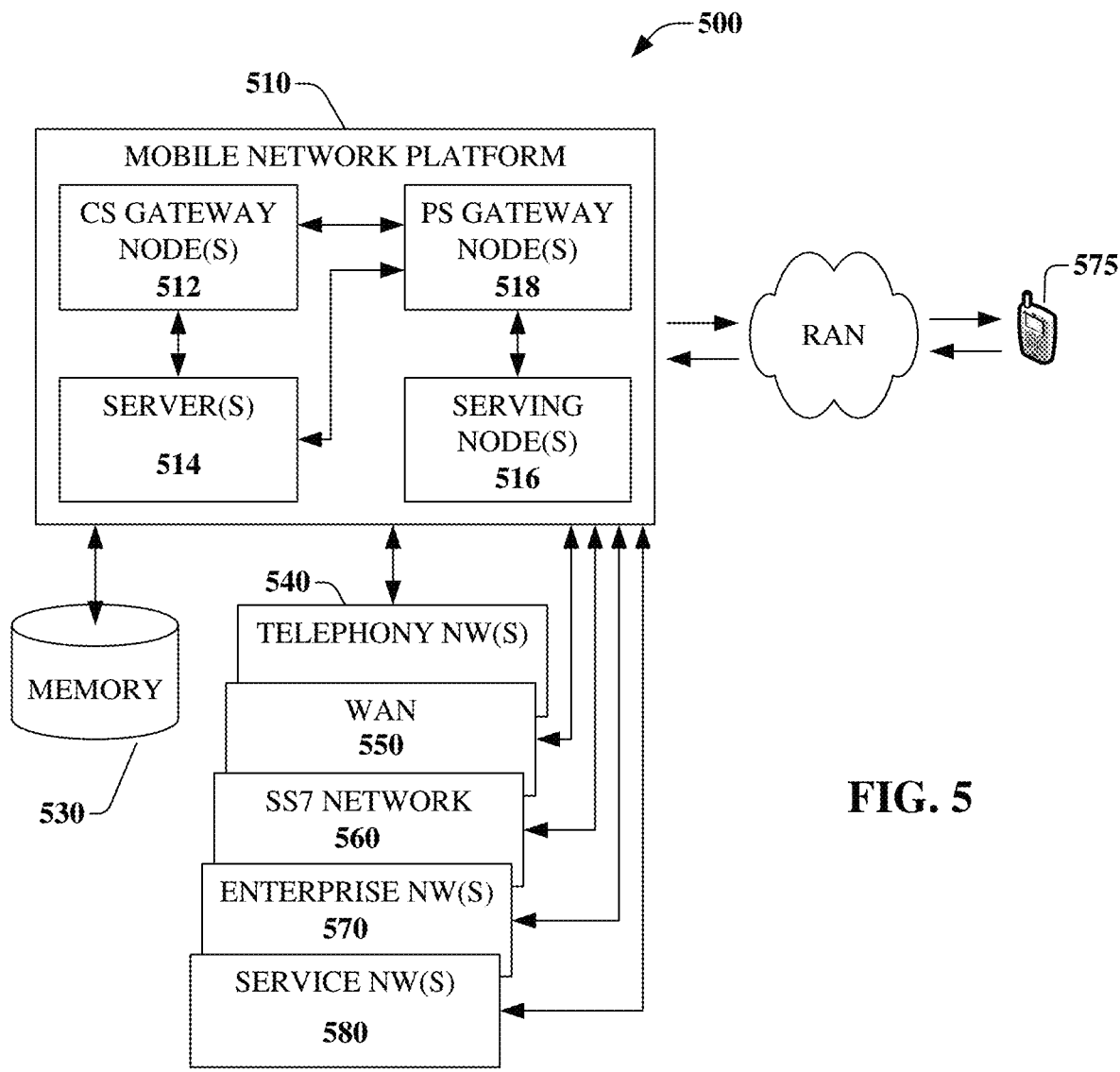
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
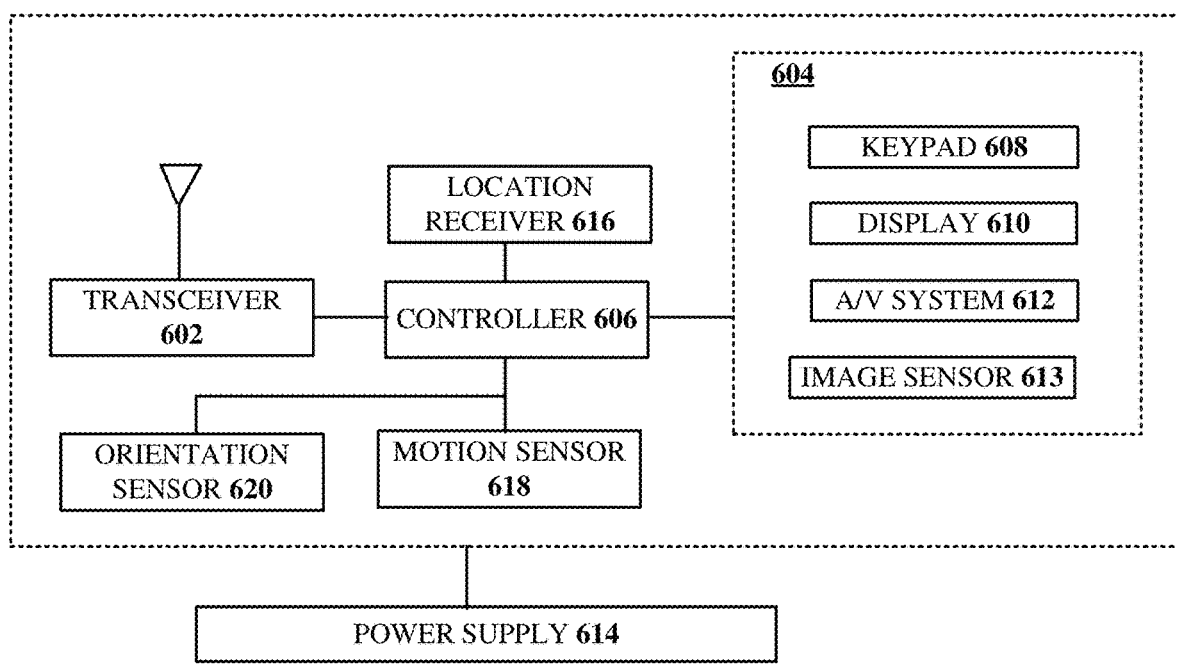
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    obtaining, by a processing system including a processor, content for presentation to a plurality of audience members;
    generating, by the processing system, a plurality of versions of the content;
    storing, by the processing system, the plurality of versions in a library accessible to the processing system resulting in a stored plurality of versions;
    configuring, by the processing system, a presentation of the content at a presentation device, wherein the configuring is performed in accordance with capabilities of the presentation device;
    detecting, by the processing system, characteristics of the plurality of audience members for the presentation;
    responsive to a determination that an appropriate version is not available in the library for presentation to at least one of the audience members according to the detecting of the characteristics, generating, by the processing system, a customized version of the content for presentation to the at least one of the audience members;
    simultaneously presenting, by the processing system, a set of versions of the content to the respective audience members, the set of versions including the customized version and at least one of the stored plurality of versions, each of the audience members accordingly experiencing a presentation version, the presentation version for at least one of the audience members comprising a content segment generated by equipment of another audience member and inserted into one of the stored plurality of versions, the content segment including an identifier of the at least one of the audience members;
    receiving, by the processing system, reaction data regarding real-time reactions of each of the audience members regarding the presentation version, the reaction data comprising signals from equipment of the audience members, images of the audience members captured by the presentation device, or a combination thereof;
    providing, by the processing system, an alternate presentation version based on the reaction data of an audience member; and
    presenting, by the processing system, the alternate presentation version to the audience member.

2. The method of claim 1, wherein the alternate presentation version is one of the plurality of versions, and wherein providing the alternate presentation version comprises retrieving the alternate presentation version from the library.

3. The method of claim 1, wherein providing the alternate presentation version comprises performing a real-time adjustment of content of the presentation version.

4. The method of claim 1, wherein the content comprises an advertisement, and further comprising determining, by the processing system, an effectiveness of the advertisement based on the reaction data.

5. The method of claim 4, wherein the presentation version for at least one of the audience members comprises a customized advertisement.

6. The method of claim 1, wherein the reaction data include a gesture, eye movement, body movement, speech, a biometric response, or a combination thereof for at least one of the audience members.

7. The method of claim 1, wherein the reaction data include sounds from the audience members captured by the presentation device.

8. The method of claim 1, wherein the content segment is generated at least in part by the equipment of the another audience member without requiring attention by that audience member.

9. The method of claim 1, wherein the content segment is stored in the library with a tag indicating a source of the content segment and the identifier of the at least one of the audience members.

10. The method of claim 1, wherein each of the stored plurality of versions has a video component and an audio component, wherein at least one of the stored plurality of versions has a distinct video component, and wherein at least one other of the stored plurality of versions has a distinct audio component.

11. A device comprising:
    a processing system including a processor; and
    a memory that stores executable instructions that, when executed by the processing system, facilitate performance of operations comprising:
    obtaining content for presentation to a plurality of audience members;
    generating a plurality of versions of the content;
    storing the plurality of versions in a library accessible to the processing system resulting in a stored plurality of versions;
    configuring a presentation of the content at a presentation device;
    detecting characteristics of the plurality of audience members for the presentation;

responsive to a determination that an appropriate version is not available in the library for presentation to at least one of the audience members according to the detecting of the characteristics, generating a customized version of the content for presentation to the at least one of the audience members;

simultaneously presenting a set of versions of the content to the respective audience members, the set of versions including the customized version and at least one of the stored plurality of versions, each of the audience members accordingly experiencing a presentation version, the presentation version for at least one of the audience members comprising a content segment generated by equipment of another audience member and inserted into one of the stored plurality of versions, the content segment including an identifier of the at least one of the audience members;

receiving reaction data regarding real-time reactions of each of the audience members regarding the presentation version, the reaction data comprising signals from equipment of the audience members, images of the audience members captured by the presentation device, sounds from the audience members captured by the presentation device, or a combination thereof;

providing an alternate presentation version based on the reaction data of an audience member; and presenting the alternate presentation version to the audience member.

12. The device of claim 11, wherein the configuring is performed in accordance with capabilities of the presentation device.

13. The device of claim 11, wherein the content comprises an advertisement, and wherein the operations further comprise determining an effectiveness of the advertisement based on the reaction data.

14. The device of claim 11, wherein the reaction data include a gesture, eye movement, body movement, speech, a biometric response, or a combination thereof for at least one of the audience members.

15. The device of claim 11, wherein the content segment is generated at least in part by the equipment of the another audience member without requiring attention by that audience member.

16. A non-transitory machine-readable medium comprising executable instructions that, when executed by a processing system including a processor, facilitate performance of operations comprising:

obtaining content for presentation to a plurality of audience members;

generating a plurality of versions of the content;

storing the plurality of versions in a library accessible to the processing system resulting in a stored plurality of versions;

configuring a presentation of the content at a presentation device;

detecting characteristics of the plurality of audience members for the presentation;

responsive to a determination that an appropriate version is not available in the library for presentation to at least one of the audience members according to the detecting of the characteristics, generating a customized version of the content for presentation to the at least one of the audience members;

simultaneously presenting a set of versions of the content to the respective audience members, the set of versions including the customized version and at least one of the stored plurality of versions, each of the audience members accordingly experiencing a presentation version, the presentation version for at least one of the audience members comprising a content segment generated by equipment of another audience member and inserted into one of the stored plurality of versions, the content segment including an identifier of the at least one of the audience members;

receiving reaction data regarding real-time reactions of each of the audience members regarding the presentation version, the reaction data comprising signals from equipment of the audience members, images of the audience members captured by the presentation device, or a combination thereof;

providing an alternate presentation version based on the reaction data of an audience member; and presenting the alternate presentation version to the audience member.

17. The non-transitory machine-readable medium of claim 16, wherein the configuring is performed in accordance with capabilities of the presentation device.

18. The non-transitory machine-readable medium of claim 16, wherein providing the alternate presentation version comprises performing a real-time adjustment of content of the presentation version.

19. The non-transitory machine-readable medium of claim 16, wherein the content comprises an advertisement, and wherein the operations further comprise determining an effectiveness of the advertisement based on the reaction data.

20. The non-transitory machine-readable medium of claim 16, wherein the content segment is generated at least in part by the equipment of the another audience member without requiring attention by that audience member.

* * * * *